United States Patent [19]

Kim et al.

[11] Patent Number: 4,557,056
[45] Date of Patent: Dec. 10, 1985

[54] ELECTRONIC ANGLE INDICATOR

[76] Inventors: Sun Kim; Bonjue Kim, both of Valley Rd., Wayne, N.J. 07470

[21] Appl. No.: 509,155

[22] Filed: Jun. 29, 1983

[51] Int. Cl.[4] .............................................. G01C 9/06
[52] U.S. Cl. ..................................... 33/366; 340/689
[58] Field of Search ................... 33/366; 340/689, 678

[56] References Cited

U.S. PATENT DOCUMENTS

| | | | |
|---|---|---|---|
| 3,805,398 | 4/1974 | Russell et al. | 33/366 |
| 3,935,643 | 2/1976 | Russell et al. | 33/366 |
| 4,094,073 | 6/1978 | Parra | 33/366 |
| 4,375,727 | 3/1983 | McAdam, Jr. et al. | 33/366 |

FOREIGN PATENT DOCUMENTS 21113  2/1983  Japan ..................................... 33/366

Primary Examiner—William D. Martin, Jr.

[57] ABSTRACT

An electronic angle indicator providing a digital indication for a desired angle comprises a pivotally suspended gravity responding pendulum retaining a ring magnet, a reference angle dial retaining a ring magnet and two magnetic field sensors, one for sensing magnetic field change of said pendulum and the other one for sensing magnetic field change of said reference angle dial. The output of said pendulum magnetic field sensor is compared with the output of said reference angle dial magnetic field sensor and causes the indicators display attainment of a desired angle orientation selected by said reference angle dial, or greater or lesser angle than the angle orientation selected by said reference angle dial.

4 Claims, 9 Drawing Figures

ELECTRONIC ANGLE INDICATOR

This invention relates to angle indicators and specifically to improved angle sensing and measuring mechanism for an angle indicator.

Heretofore, there have been many prior art on electrical indicators. These prior art adapted a light emitting and light detecting technique to indicate an object angle orientation by detecting either a vial air bubble or a rotor slot position. Two pair of light sources and detectors are positioned such that one end of the vial bubble or the rotor slot is positioned in between one of the light sources and one of the light detectors, and the other end of vial bubble or the rotor slot is positioned in between the other light source and detector when an inherently predetermined angle orientation, either horizental or vertical angle, is found, these cause to display one indicator for a correct angle, and another indicator for greater angle and another indicator for lesser angle than one of the inherently predetermined angles.

These type of devices, however, have a problem obtaining an accurate angle measurement caused by the angle sensing technique and mechanism, and lose reliability as the light sources age and the power source is slightly lower or higher than a predetermined value. These prior art, moreover, have limitations being measured since only the inherently predetermined angles are recognized, and lose practicality since the devices are complex in structure and bulky in size.

Accordingly, several objects of my invention are;

a. to provide accuracy of angle measurement by adapting magnetic field sensing mechanism;

b. to eliminate the inherent limitation on measuring angle orientations of various objects;

c. to improve the reliability caused by aging of the angle sensing mechanism;

d. to improve the dependance on power source;

e. to provide simplicity in structure; and f. to provide small in size and compactness.

Further objects and advantages of my invention will become apparent from a consideration of the drawings and ensuring description thereof.

DRAWINGS

DESCRIPTION

Figure 1:
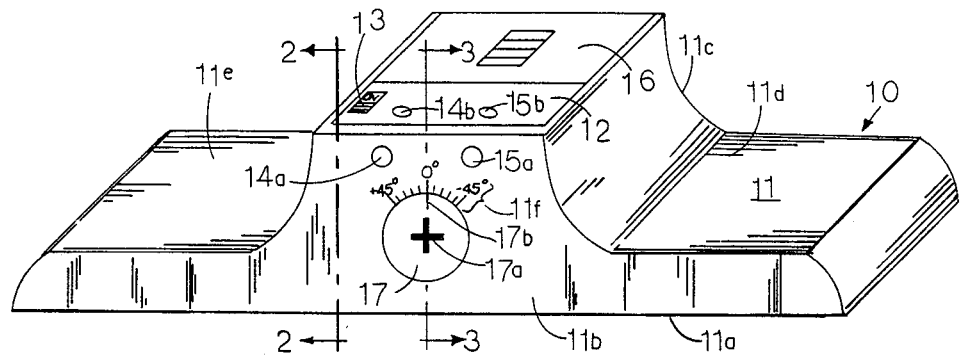
FIG. 1 shows a plan view of an embodiment of the electronic angle indicator of present invention.

Refering to the drawings and more particularly FIG. 1, it can be seen an improved electronic angle indicator 10 having a rugged principle body 11, which is made of a durable plastic or the like.

The casing 11 is comprised of a flat contacting surface 11a to make contact with objects to measure their angle orientations, a side wall 11b having non-protruding rotatable angle dial 17, two circular display windows 14a,15a which pass through light beam generated by LED's 14,15 respectively, a top cover 12 having two circular display windows 14b,15b which pass through the light beam generated by LED's 14,15 respectively and an electrical power ON-OFF slide switch 13, a battery compartment cover 16 which is used to replace a battery 25, a side wall 11c, and both sides of symetrical top surfaces 11d,11e having curvacious surfaces as shown in FIG. 1.

Figures 2, 3:
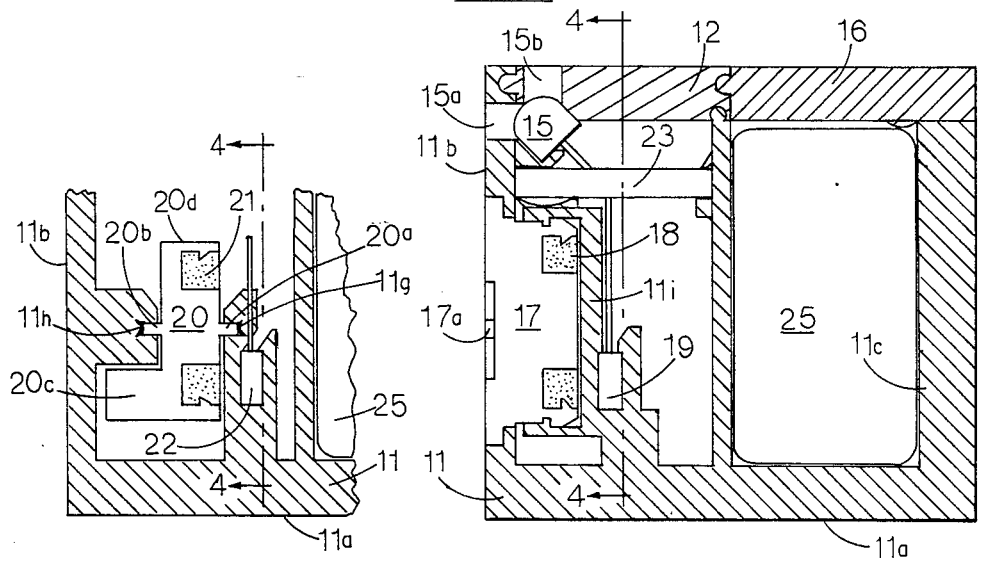
FIG. 2 shows a cross sectional view taken along the line 2—2 shown in FIG. 1.
FIG. 3 shows a cross sectional view taken along the line 3—3 shown in FIG. 1.
Figure 4:
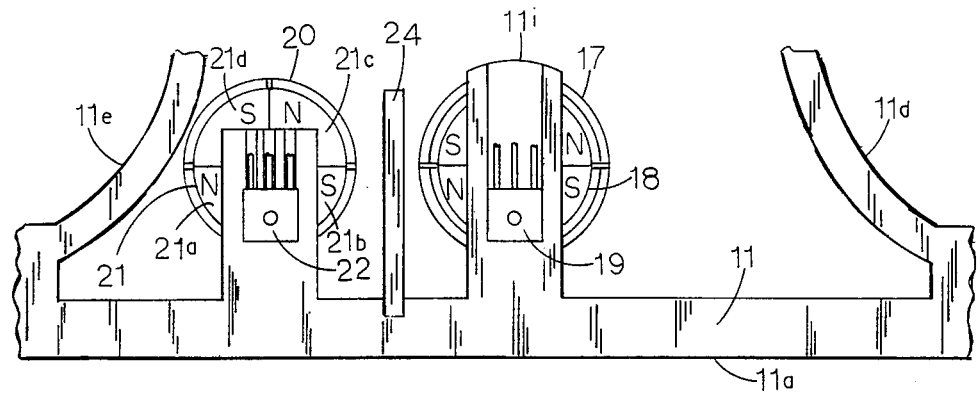
FIG. 4 shows a cross sectional view taken along the line 4—4 shown in FIG. 2 and FIG. 3.
Figure 5:
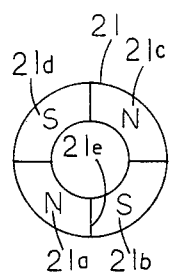
FIG. 5 is a detailed drawing of a ring magnet utilized in present invention.

A gravity responding pendulum assembly 20 is consisted of two pivots 20a, 20b in the center of front and back side of the pendulum assembly 20 respectively, a weight 20c on the bottom of the back side of the pendulum assembly 20 and a ring magnet holder 20d which retains a ring magnet 21 as shown in FIG. 2. The ring magnet 21 is composed of a north pole 21c in the first quadrant, a south pole 21d in the second quadrant, a north pole 21a in the third quadrant and a south pole 21b in the fourth quadrant as shown in FIG. 5.

The ring magnet 21 is mounted in the magnetic holder 20d such that the boundary line 21e of the north pole 21a and the south pole 21b is coinsided with the line between the center of the pivot and the center of mass of the pendulum assembly 20. The ring magnet 21 has a dimension of 0.125 inch in inner diameter, 0.25 inch in outer diameter and 0.125 inch in thickness or the like and is made of ALNICO V magnet or the like. Pivot holders 11g,11h are designed to maximize responding sensitivity of the pendulum assembly 20 to gravity field.

A magnetic sensor 22 is mounted on the lower front side of the pendulum assembly 20 with a predetermined distance and on the center of the boundary line 21e of the north and the south pole 21a,21b so that the minimum magnetic field strength is applied to the magnetic sensor 22 when the contacting surface 11a is placed on an object having one of multiple angle orientations of 90 degrees which are 0, 90, 180 and 270 degrees with respect to gravity field, and the maximum magnetic field strength on an object of 45,135,225 and 315 degrees of angle orientations with respect to gravity field.

A reference angle dial 17 which rotatablely selects a desired angle is consisted of a cross shaped groove 17a which provides a means to rotate the reference angle dial 17, and a hair line 17b which provides a means aligning with angle indicia 11f. The reference angle dial 17 also retains a multi-pole ring magnet 18 which is identical to said multi-pole ring magnet 21 and is mounted in the reference angle dial 17 in the same way as the way said multi-pole ring magnet 21 is mounted. A reference angle dial retainer 11i provides holding and supporting means to the reference angle dial 17 and provides a desired reference angle position latching means for the multiple angle orientations of 90 degrees and angle position holding means for angles other than the multiple angle orientations of 90 degrees. A magnetic sensor 19 is identical to the magnetic sensor 22 and is mounted in the reference angle dial retainer 11i in the same way as the way as the magnetic sensor 22 is mounted. A magnet shield 24 is employed to prevent a possible magnetic interference between the ring magnet 21 in the pendulum assembly 20 and the ring magnet 18 in the reference angle dial 17. An electronic circuit board 23 is mounted in the cavity of the principle body 11 to provide means of electronic circuit implementation.

Figure 6:
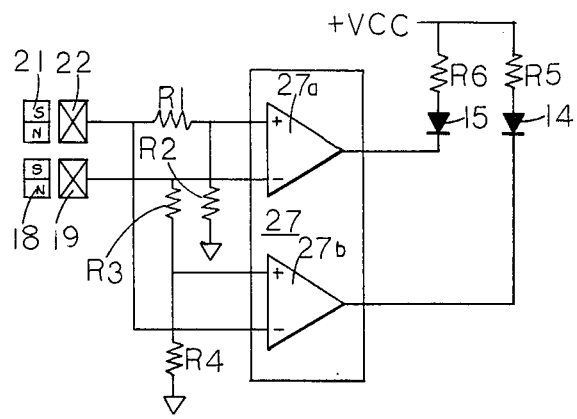
FIG. 6 is a schematic diagram used for the electronic angle indicator of present invention.

In FIG. 6, a typical schematic diagram of the electronic angle indicator 10 is schematically illustrated.

Comparators 27a, 27b, such as LM119 device supplied by National Semiconductor Corporation, form a limit comparator 27 and drive the LED's 14,15 of the angle electronic indicator 10.

The output of the magnetic sensor 22, such as UGN-3501T device supplied by Sprague Electronic Company, is connected to a negative terminal of the comparator 27b and to one end of a resistor R1. The other end of the resistor R1 is connected to a positive terminal of the comparator 27a and one end of a resistor R2, and the other end of the resistor R2 is connected to the ground.

The output of the magnetic sensor 19 is connected to the negative terminal of the comparator 27a and one end of a resistor R3. The other end of the resistor R3 is connected to the positive terminal of the comparator 27b and one end of a resistor R4, and the other end of the resistor R4 is connected to the ground. The output of the comparator 27a is connected to the cathode terminal of the LED 15, and the output of the comparator 27b is connected to the cathode terminal of the LED 14. The anodes of the LED's 14,15 are connected through resistors R5,R6 respectively to the power source 25, such as 9 v dry cell battery. A set of typical values of the resistors R1, R2, R3, R4, R5 and R6 are respectively 100, 20,000, 100, 20,000, 330 and 330 ohms.

The reference angle dial 17 provides a means to select a desired relative reference angle by aligning the hair line 17b with the angle indicia 11f. The 0 degree scale of the angle indicia 11f is used to measure the multiple angle orientations of 90 degrees of an object. The positive indicia scales other than the 0 degree scale is used to select a desired reference angle of counter clockwise inclinations up to +45 degrees from the multiple angle orientations of 90 degrees of an object. The negative indicia scales are used to select a desired reference angle of clockwise inclinations up to −45 degrees from the multiple angle orientations of 90 degrees of an object.

The magnetic sensor 19 senses change in magnetic field intensity and converts the magnetic field intensity to electrical signal on the output of the magnetic sensor 19, which is a DC anolog signal, when the reference angle dial 17 changes its position. The electrical signal so produced by the magnetic sensor 19 establishes an upper limit to the limit comparator 27 and a lower limit, which is generated from the upper limit by a voltage devider comprised of the resistors R3, R4, to the limit comparator 27. The output of the magnetic sensor 19 is adapted to reference the upper and lower limit to improve the accuracy of the electronic angle indicator 10 to compensate aging problem and the dependance on the power source.

As the contacting surface 11a of the electronic angle indicator 10 is tilted to counter clockwise or clockwise direction from the multiple angle orientations of 90 degrees of an object, the gravity responding pendulum assembly 20 seeks for the gravity field and provides the magnetic sensor 22 positive or negative magnetic field, respectively. The magnetic sensor 22 converts the positive or negative magnetic field intensity, respectively to more or less positive electrical signal at the sensor output, which is a DC anolog signal. The sensor output so converted is compared with the lower limit of the limit comparator 27.

The LED 14 is lit when the sensor output is higher than the lower limit and is extinguished when the sensor output is lower than the lower limit of the limit comparator 27. The sensor output is attenuated by the voltage divider comprised of the resistors R1, R2, and the divider output signal is compared with the upper limit of the window comparator 27. The LED 15 is lit when the sensor output is lower than the upper limit and is extinguished when the sensor output is higher than the upper limit of the limit comparator 27. Both of the LED's 14, 15 are lit with the sensor output is lower than the upper limit and higher than the lower limit of the limit comparator 27.

Summerizing the operation of this invention, the LED 14 is lit when an angle orientation of an object being measured has an angle displacement lying in the counter clockwise direction with respect to an angle selected by the reference angle dial 17. The LED 15 is lit when an angle orientation of the object being measured has an angle displacement lying in the counter clockwise direction with respect to the angle selected by the reference angle dial 17. Both of the LED's 14,15 are lit when an angle orientation of the object being measured has the same angle orientation as the angle selected by the reference angle dial 17.

Figure 7:
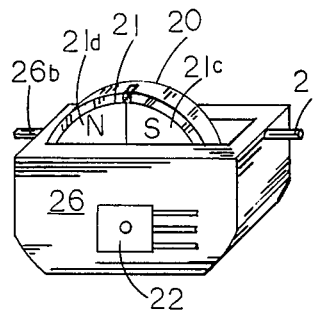
FIG. 7 shows a pendulum assembly to be used for a special application of present invention.
Figure 8:
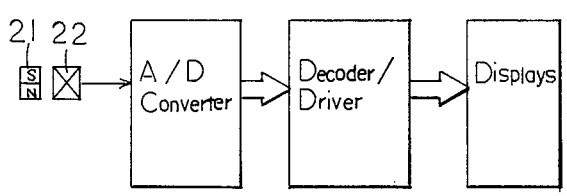
FIG. 8 is an electronic functional block diagram of a direct angle measuring means of present invention.
Figure 9:
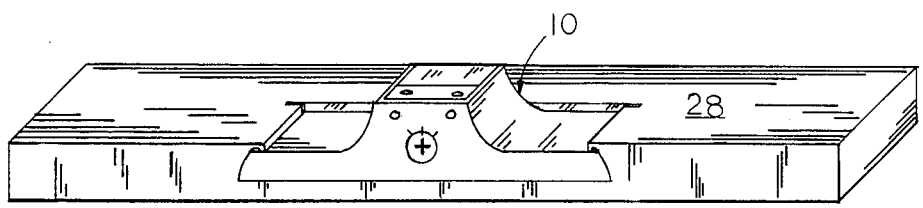
FIG. 9 shows an extender of the electronic angle indicator for larger scale applications.

While the above description contains many specificities, these shall not construed as limitations on the scope of the invention, but rather as an exemplification of one preferred embodiment thereof. Many other variations are possible, for example; instead of using as a desired angle indication means, a direct angle readout means of an object being measured may be used simply by adapted an anolog to digital conversion means and displaying the angle in digits as shown in FIG. 8; instead of utilizing one axis pendulum mechanism, two axis pendulum mechanism 26 as shown in FIG. 7 may be adapted to provide capability to compensate for severe tilt against the pendulum pivot axis 20a, 20b, when measuring horizontal angle orientation for a special application, by mounting pivots 26a, 26b of the two axis pendulum mechanism 26 orthogonally in place of the pendulum assembly 20 in FIG. 2; to provide variety of applications of present invention, especially for a larger scale application, an extender 28 shown in FIG. 9 may be used.

Accordingly, the scope of the invention should be determined not by the embodiment illustrated, but by the appended claims and their legal equivalents.

What is claimed is:

1. An angle indicator comprising:
a case having a contacting surface;
a case tilt response means having a disc, which has a pivot through the center of the disc and a properly unbalanced center of mass for always seeking for the center of gravity field and for damping possible oscillation, pivotally mounted in said case and retaining at least one magnet source therein to provide a case tilt information in terms of magnetic field intensity; utilizing a magnetic field sense means to properly sense the magnetic field intensity of said case tilt response means and producing an electrical signal proportional to the magnetic field intensity;
a desired case orientation selection means mounted on said case to be able to change positions for desired case orientations and retaining at least one magnet source to provide a desired case orientation reference in terms of magnetic field intensity;

utilizing a magnetic field sense means mounted in said case at a distance to properly sense the magnetic field intensity of said desired case orientation selection means and producing an electrical reference signal proportional to the magnetic field intensity;

a correct angle attainment decision means with respect to said desired case orientation reference having an upper and a lower limit decision making circuit; and display means mounted on said case for displaying a first indicator for a lesser angle, a second indicator for a greater angle and the both indicators for a correct angle attainment with respect to a desired case orientation selection.

2. An angle indicator comprising:

a case having a contacting surface;

a case tilt response means having a disc, which has a pivot through the center of the disc and a properly unbalanced center of mass for always seeking for the center of gravity field and damping possible oscillation, pivotally mounted in said case and retaining at least one magnet source therein to provide a case tilt information in terms of magnetic field intensity;

utilizing a magnetic field sense means to properly sense the magnetic field intensity of said case tilt response means and producing an electrical signal proportional to the magnetic field intensity;

utilizing an analog to digital converter means to convert said electrical signal to a digital electronic signal;

a decoder and driver means to decode the converted digital electronic signal into decimal numbers; and utilizing angle display means to provide an angle display in decimal numbers.

3. An angle indicator of claim 1 or 2, wherein said contacting surface further comprises a contacting surface extension means having a recess to mount said angle indicators and an extended contacting surface of a larger scale measurement.

4. An angle indicator of claim 1 or 2, wherein said case tilt response means further comprises a compensation means to avoid severe tilt against the rotating axis of said case tilt response means.

* * * * *